United States Patent

Teindas

Patent Number: 5,560,072
Date of Patent: Oct. 1, 1996

[54] SCREEN WIPING APPARATUS HAVING A COUPLING PIECE

[75] Inventor: Jean-Louis Teindas, Ravel, France

[73] Assignee: Valeo Systemes D'Essuyage, Montigny-le-Bretonneux, France

[21] Appl. No.: 243,572

[22] Filed: May 16, 1994

[30] Foreign Application Priority Data

May 17, 1993 [FR] France .................. 93 05928

[51] Int. Cl.⁶ .................................................. B60S 1/40
[52] U.S. Cl. .............................. 15/250.32; 15/250.31
[58] Field of Search ..................... 15/250.32, 250.31, 15/250.33, 250.351, 250.41, 250.34, 250.43, 250.44, 250.451, 250.452, 250.453, 250.454, 250.46

[56] References Cited

U.S. PATENT DOCUMENTS

| 3,416,180 | 12/1968 | Deutscher et al. | 15/250.32 |
| 3,757,377 | 9/1973 | Hayward | 15/250.32 |
| 3,942,212 | 3/1976 | Steger et al. | 15/250.32 |
| 4,446,589 | 5/1984 | Maiocco | 15/250.32 |

FOREIGN PATENT DOCUMENTS

| 0234525 | 9/1987 | European Pat. Off. . | |
| 2158945 | 6/1973 | France . | |
| 2247082 | 5/1975 | France | 15/250.32 |
| 2297754 | 8/1976 | France . | |
| 2631300 | 11/1989 | France . | |
| 2128739 | 12/1971 | Germany | 15/250.32 |
| 893229 | 4/1962 | United Kingdom | 15/250.32 |

Primary Examiner—Gary K. Graham
Attorney, Agent, or Firm—Morgan & Finnegan, LLP

[57] ABSTRACT

A screen wiper apparatus, especially for motor vehicles, is of the type comprising a screen wiper arm and a wiper blade secured removably to one end of the arm by means of a coupling piece. The coupling piece has a recess for accommodating the wiper arm, together with articulating means which cooperate with complementary hook means on the wiper blade. The coupling piece is resiliently deformable so that it can be fitted between the side portions of the middle part of the main yoke of the blade. The coupling piece comprises two resiliently deformable side walls which are joined together by a bridge element on the same side as the engagement of the coupling piece with the wiper arm, the side walls being joined together on the opposite side by a transverse wall. A projection for cooperation with the hook on the wiper arm is provided on the internal surface of each side wall of the coupling piece, while on the external surface of each of these walls there is a further projection for cooperation with the wiper blade.

4 Claims, 1 Drawing Sheet

મેવ5,560,072

SCREEN WIPING APPARATUS HAVING A COUPLING PIECE

FIELD OF THE INVENTION

The present invention relates to a screen wiping apparatus of the type comprising a screen wiper arm and a wiper blade removably secured to one end of the wiper arm by means of a coupling piece.

BACKGROUND OF THE INVENTION

A number of different types of coupling piece for this purpose are already known. In particular, French patent No. 2 297 754 describes a coupling piece which is resiliently deformable, in such a way that it can be fitted between the side or lateral portions of the middle part of the main yoke of the wiper blade. In order to fit the coupling piece disclosed in the above mentioned French patent specification, lateral pressure is exerted on it, and it is then introduced into the window which is arranged in the middle portion of the main yoke of the wiper blade.

However, it has become evident that the side pressure exerted on the coupling piece tends to cause its transverse arms to break, which renders the coupling piece useless. In addition, these coupling pieces of the prior art are specific to one type of arm and to one type of wiper blade.

DISCUSSION OF THE INVENTION

The object of the present invention is to overcome these drawbacks, by providing a coupling piece of a universal nature, i.e. one which is capable of being used with different types of wiper arm and/or different types of wiper blade assemblies, and which also has increased mechanical strength so as to withstand the lateral deformations necessary for fitting it between the lateral portions of the main yoke of the wiper blade.

For this purpose, the invention provides a screen wiping apparatus which includes a coupling piece comprising two resiliently deformable side walls which are joined together by a bridge element on the same side as the engagement of the wiper arm with the coupling piece, and by a transverse wall on the opposite side, with each side wall having on its inner surface an inner circular projection for cooperation with a U-shaped hook which is formed at the free end of the wiper arm, while on an outer surface of each side wall of the coupling piece there is an outer circular projection for cooperation with the wiper blade.

Preferably, the bridge element joins the upper edges of the side walls of the coupling piece together. The bridge element contributes to the positioning of the arm in the coupling piece itself.

Preferably, each side wall of the coupling piece is in the form of a plate-like element having a height which is at least equal a separation distance defined by upper and lower leg portions of the hook formed in the end of the wiper arm, with each of these plate-like elements carrying the first and second projections and also being extended by a nose, the upper edge of which is aligned with the upper edge of the plate-like element, the depth of the nose being less than that of the latter.

The invention will be more clearly understood on a reading of the description of preferred embodiments of the invention which follows, and which is given by way of example only and with reference to the accompanying drawings.

DESCRIPTION OF PREFERRED EMBODIMENTS OF THE INVENTION

Figure 1:
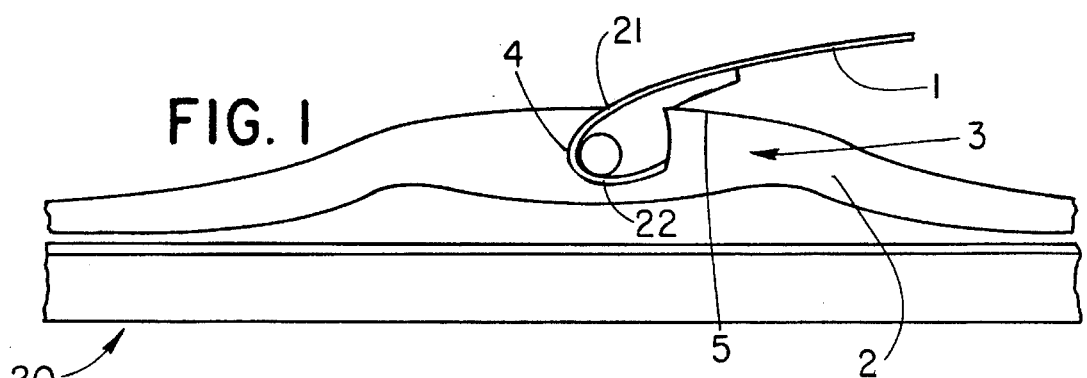
FIG. 1 is a diagrammatic view of a screen wiping apparatus.

The screen wiping apparatus shown diagrammatically in cross section in FIG. 1 comprises an arm 1 and a screen wiper blade assembly 20, the main yoke 2 of which is connected to the arm 1 through a coupling piece 3.

The end of the arm 1 is curved into the form of a U-shaped hook 4. The U-shaped hook defines an upper and lower portion 21, 22 spaced a predetermined distance apart. This hook-shaped end enables the main yoke 2, and therefore the screen wiper blade assembly 20, to be articulated to the arm 1 as indicated at 5 in FIG. 1, through the coupling piece 3. For this purpose, the main yoke 2 is formed with a window 5 which enables the hook-shaped end 4 and the coupling piece 3 to be introduced into it. The coupling piece 3 consists generally of a component of plastics material having a cavity for accommodating the hook-shaped end 4.

Figure 2:
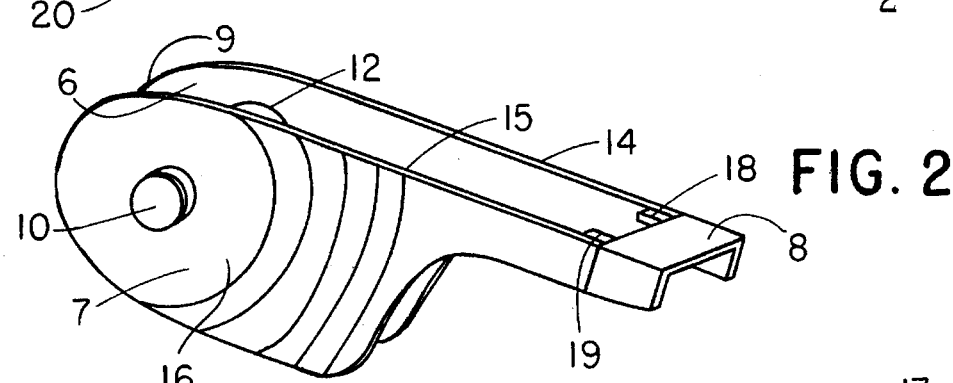
FIG. 2 is a perspective view of the coupling piece in accordance with the invention.

FIG. 2 shows in perspective one embodiment of a coupling piece 3. This coupling piece comprises two side walls 6 and 7 which are joined together at one side through a bridge element 8, and at the other side through a transverse wall 9. An outer projection 10 having a substantially circular cross section extends from an outer surface of each of the side wall portions 6 and 7. The projections 10 provide the articulation between the coupling piece and the associated portions of the main yoke 2, i.e. the lateral portions of the middle part (see FIG. 1) of the yoke lying on either side of the window 5. The cross section of the external projections 10 corresponds substantially to the internal cross section of the apertures (not shown) which are formed in the usual way in these lateral portions of the main yoke 2.

The inner surface of each of the side walls 6 and 7 of the coupling piece has a substantially circular projection 12, the outer periphery of which corresponds to the curvature of the hook-shaped end 4 of the arm 1.

Figure 3:
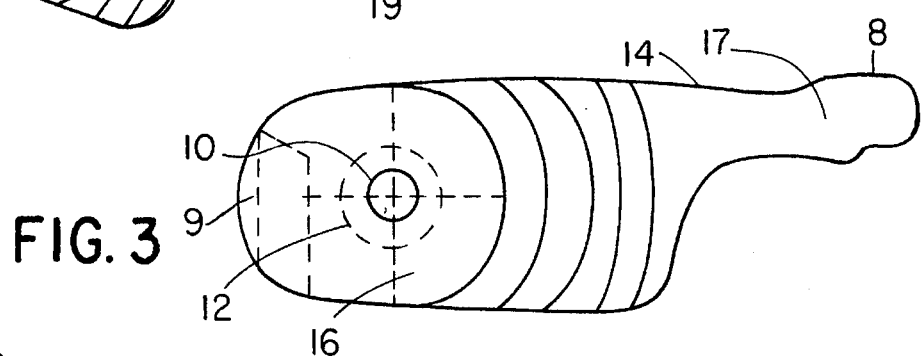
FIG. 3 is a front view of the coupling piece in accordance with the invention.
Figure 4:
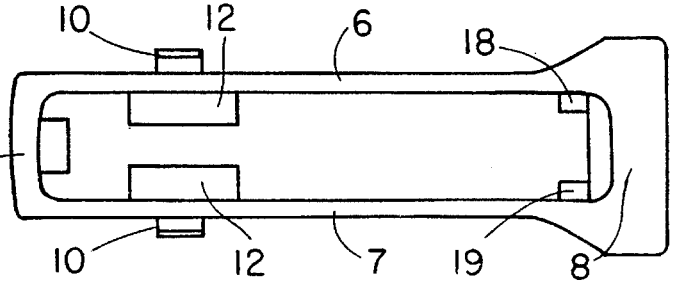
FIG. 4 is a top plan view of the coupling piece in accordance with the invention.

As can be seen best in FIGS. 3 and 4, the projections 10 of each side wall 6 and 7 are coaxial with each other, and in this embodiment they are also coaxial with the projections 12, the latter being coaxial with each other. FIGS. 3 and 4 show a front view and a top plan view respectively of the same coupling piece as is shown in FIG. 2.

The side walls 6 and 7 have, in the region of the projections 10 and 12, a flank 16, the height of which is at least equal to the distance of the hook 4, with the flank 16 being extended in a direction away from the hook by means of a nose 17, which is of reduced height.

The bridge element 8 joins together the upper edges 14 and 15 of the noses 17 of the side walls 6 and 7 respectively. It extends at right angles to the side walls 6 and 7. Similarly, the flanks 16 of the side walls 6 and 7 are joined together through the transverse wall 9 in front of the projections 10 and 12, while the elasticity of the side walls 6 and 7 and of the transverse wall 9 enable the coupling piece to be introduced through the window 5 in the usual way, and between the above mentioned lateral portions of the main yoke 2. For this purpose, a pressure is exerted on the two side walls 6 and 7 at right angles to their respective surfaces. The deformation resulting from this pressure enables the external projections 10 to be introduced into the above mentioned apertures in the main yoke. After the coupling piece has been thus fitted on the wiper blade, it is fitted on the arm 1 by introduction of the hook 4 around the internal projections 12.

The coupling piece has in the region of the bridge element 8 a pair of lateral seating nibs 18 and 19, which project inwardly from the side walls 6 and 7, along the upper edges 14 and 15 of the latter. These seating nibs 18 and 19 are provided for the purpose of immobilising the coupling piece with respect to the arm 1.

Figure 5:
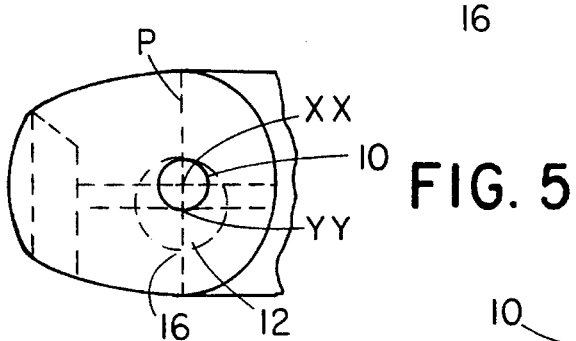
FIG. 5 is a partial front view of the coupling piece in another embodiment in accordance with the invention.

Reference is now made to FIG. 5, which shows a modified embodiment in which the axis XX, of the external projections 10 which are formed on each side wall 6 and 7, is different from the axis YY of the internal projections 12. As can be seen clearly from FIG. 5, the axis YY is offset downwardly with respect to the axis XX, while being in the same transverse plane P that passes through the axes XX and YY. This enables arms of various thicknesses to be used without any detriment by the latter to good operation of the apparatus, and without any detraction from the appearance of the apparatus.

The invention is of course not limited by the embodiments described above, and the person skilled in the art will be able to conceive further variations without in any way departing from the scope of the invention.

What is claimed is:

1. A screen wiper assembly, said assembly comprising:
   an elongated screen wiper arm having first and second ends, said first end having a predetermined curvature which defines a U-shaped hook thereon, said U-shaped hook having an upper and lower leg portion, said portions being spaced by a predetermined distance;
   a wiper blade assembly including an elongated main yoke, said main yoke including a middle part having a pair of spaced lateral portions defining a window therebetween, each lateral portion having an aperture therethrough, said apertures being coaxial with one another; and
   an elongated coupling piece for removably and pivotally connecting said arm to said main yoke, said coupling piece comprised of a pair of elongated, laterally spaced, resiliently deformable, planar side walls, each side wall having first and second ends and an intermediate portion therebetween of predetermined height, said height being substantially equal to said distance, each side wall defining upper edges thereof and each side wall defining inner and outer surfaces, wherein said inner surfaces face one another, said first ends of said side walls being rounded and connected together by a transverse wall, said second ends of said side walls having a height less than said predetermined height such that said second ends form a nose on said coupling piece, said second ends of said side walls are connected together on said nose by a transverse bridge element joining together said upper edges, said side walls, transverse wall and bridge element together forming a cavity in said coupling piece, each side wall has an inner circular projection extending from said inner surfaces and an outer circular projection extending from said outer surface, said inner circular projections being coaxial with one another and said outer projections being coaxial with one another, said circular inner projections defining a peripheral curvature substantially equal to said predetermined curvature of said U-shaped hook, said U-shaped hook is received in said cavity and engages said inner projections to secure said arm with said coupling piece, said circular outer projections are received into said apertures on said main yoke for pivotally connecting said coupling piece with said yoke.

2. A screen wiper apparatus according to claim 1, wherein said inner and outer projections define at least one axis thereof, a distance between said at least one axis and the bridge element being substantially greater than a distance between the said at least one axis and the transverse wall.

3. A screen wiper apparatus according to claim 1, wherein the inner projections are coaxial with the outer projections.

4. A screen wiper apparatus according to claim 1, wherein the inner projections define a first common axis and the outer projections define a second common axis different from the first axis.

* * * * *